United States Patent

[11] 3,625,917

| [72] | Inventor | Bruce A. Ashby |
| | | Schenectady, N.Y. |
| [21] | Appl. No. | 679,948 |
| [22] | Filed | Sept. 20, 1967 |
| [45] | Patented | Dec. 7, 1971 |
| [73] | Assignee | General Electric Company |
| | | Original application Dec. 16, 1963, Ser. No. 330,607, now Patent No. 3,360,538. Divided and this application Sept. 20, 1967, Ser. No. 679,948 |

[54] ORGANOSILICON MATERIALS
3 Claims, No Drawings

[52] U.S. Cl.................................................. 260/46.5,
260/448.2, 260/37
[51] Int. Cl.................................................... C08f 11/04,
C08g 51/04
[50] Field of Search........................................... 260/46.5,
46.5 G, 37 SI, 448.2

[56] References Cited
UNITED STATES PATENTS

| 3,148,201 | 9/1964 | Fassnacht...................... | 260/448.2 |
| 3,360,538 | 12/1967 | Ashby.......................... | 260/448.2 |

Primary Examiner—Donald E. Czaja
Assistant Examiner—M. I. Marquis
Attorneys—William A. Teoli, Robert S. Friedman, Abraham Cohen, Frank L. Neuhauser and Oscar B. Waddell ABSTRACT: Organopolysiloxane cyclics and polymers are provided which are substituted with fluorinated monovalent hydrocarbon radicals of the formula, $H(C_2F_4)_n CHR-CR_2-$ attached to silicon by carbon silicon linkages, where R is selected from hydrogen and a lower alkyl radical, and $n$ is an integer equal to from 1 to 3, inclusive. The above, organosiloxane materials substituted with fluorinated monovalent hydrocarbon radicals can be employed to make a variety of oil resistant polymers and copolymers.

ORGANOSILICON MATERIALS

This application is a division of my application Ser. No. 330,607, filed Dec. 16, 1963 now Pat. No. 3,360,538, entitled "Fluoroorgano-Substituted Silanes."

The present invention relates to organosilicon materials having fluorinated monovalent hydrocarbon radicals attached to silicon by carbon-silicon linkages.

The organosilicon materials of the present invention have at least one chemically combined unit of the formula, (1) 

where $a$ is an integer equal to from 1 to 4, inclusive, Z is $H(C_2F_4)CHR-C(R)_2-$, R is selected from hydrogen and a lower alkyl radical, and $n$ is an integer equal to from 1 to 3, inclusive, where the valences of silicon in said unit of formula (1), other than those satisfied by Z radicals, can be satisfied by a radical selected from hydrogen, R', X and $(O)_{y/2}$, where R' is selected from monovalent hydrocarbon radicals, halogenated monovalent hydrocarbon radicals, and cyanoalkyl radicals, X is halogen, and $y$ has a value between 0.5 to 1.5, inclusive.

For example, there is included by the present invention, silanes having the formula, (2) 

where Z, X and $a$ are as defined above, R'' is selected from hydrogen, and R' radicals, $b$ is a whole number equal to from 0 to 3, inclusive, $c$ is a whole number equal to from 0 to 3, inclusive, and the sum of $a$, $b$, and $c$ is equal to 4.

There is also included by the present invention organosilicon cyclics having the formula, (3) 

where Z and R' are as defined above, and $m$ is an integer equal to from 3 to 8, inclusive.

The organosilicon silanes of formula (2) can be made by reacting a silicon hydride having the formula, (4) 

and a fluoroalkene having the formula, (5)     $H(C_2F_4)_nCR-C(R)_2$, in the presence of a platinum catalyst, where the terms employed in formulas (4) and (5) are the same as previously defined. The organosilicon cyclics of formula (3) can be made by conventional hydrolysis of dihalosilane included by formula (2)

Radicals included by R are for example, methyl, ethyl, propyl, butyl, isobutyl, pentyl, hexyl, heptyl, octyl, etc. Radicals included by R' are aryl, and halogenated aryl radicals, such as phenyl, tolyl, chlorophenyl, naphthyl, etc.; aralkyl radicals such as phenylethyl, etc.; aliphatic, cyclobutyl, and haloaliphatic, such as cyclohexyl, cyclobutyl, etc.; alkyl, alkenyl, and alkynyl, such as methyl, ethyl, propyl, vinyl, allyl, trifluoroethyl, etc.; cyanoalkyl radicals such as cyanoethyl, cyanopropyl, cyanobutyl, etc. In the above formulas, and in formulas hereinafter, where monovalent radicals attached to silicon, for example, R and R' can represent respectively more than one radical, these radicals can be all the same or they can be different.

The silanes of formula (2), and the organosilicon cyclics of formula (3), can be liquids, or solids, depending upon the ratio of "Z" radicals to silicon atoms, and the number of tetrafluoroethylene units in a particular Z radical. Because they have Z radicals with terminal hydrogen atoms, certain of the liquid silanes included by formula (2) possess valuable low temperature fluidity; these liquids are particularly valuable as hydraulic fluids.

There is also included by the present invention, homopolymers composed of chemically combined units of formula (1), and copolymers of from 0.01 to 99.99 mole percent of organosiloxy units of the formula, (6)     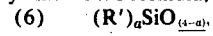

where R' is as defined above, and $a$ is an integer equal to from 1 to 3, inclusive. The polymers and copolymers of the present invention composed of units of formulas (1) and (6) can be fluids, resins, gums, infusible solids, etc., depending upon the ratio of Z radicals, or R' radicals, or the sum of Z and R' radicals to silicon atoms.

Among the copolymers included by the present invention, are copolymers which can be formed by equilibrating organosilicon cyclics of formula (3), and cyclopolysiloxanes having the formula, (7) 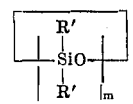

where R' and $m$ are as defined above. The equilibration of the organosilicon cyclics shown by formula (3) and (7) can be accomplished by the use of base catalyst such as alkali metal hydroxides, quaternary ammonium hydroxide, organosilicon salts of such hydroxides, etc. Specific examples of the catalyst that can be employed are the hydroxides of cesium, potassium, sodium, lithium and $(CHR)_3SiOK$, beta-hydroxyethyltrimethylammonium hydroxide, etc.

A significant feature of the organosilicon materials of the present invention is that the Z radicals attached to silicon have a terminal hydrogen atom. This provides for a reactive site and a variety of advantageous results. For example, the organosilicon materials of the present invention possess plural sites for cross-linking with olefinic materials by use of peroxide catalyst. The resulting materials can be rendered more compatible with organic compositions. Such modified polymers of the present invention, for example, can be painted more readily with standard organic paints.

Silanes included by formula (2), are for example, tetrakis-3,3,4,4-tetrafluorobutylsilane, tris-3,3,4,4-tetrafluorobutylsilane, bis-3,3,4,4-tetrafluorobutylsilane, bis-3,3,4,4-tetrafluorobutylmethylchlorosilane, 3,3,4,4-tetrafluorobutyldimethylchlorosilane, 3,3,4,4-tetrafluorobutylmethyldichlorosilane, 3,3,4,4-tetrafluorobutyltrichlorosilane, 3,3,4,4-tetrafluorobutyldiphenylchlorosilane, 3,3,4,4-tetrafluoro-2-methylbutyltrichlorosilane, 3,3,4,4-tetrafluorobutylphenyldichlorosilane, 3,3,4,4-tetrafluorobutyltrichlorosilane; 3,3,4,4,5,5,6,6-octafluorohexylmethylphenylchlorosilane, 3,3,4,4,5,5,6,6-octafluorohexyltrichlorosilane, 3,3,4,4,5,5,6,6,7,7,8,8,-dodecafluoroctylmethyldichlorosilane, etc.

Included by the organosilicon cyclics shown by formula (3) are 2,4,6-tris-(3',3',4',4'-tetrafluorobutyl)-2,4,6-trimethylcyclotrisiloxane, 2,4,6-tris-(3',3',4'4'-tetrafluorobutyl)-2,4,6-triphenylcyclotrisiloxane, 2,4,6,8-tetrakis-(3',3',4',4'-tetrafluorobutyl)-2,4,6,8-tetramethylcyclotetrasiloxane, 2,4,6-tris-(3',3',4',4',5',5',6',6'-octafluorohexyl)-2,4,6-trimethylcyclotrisiloxane, 2,4,6-tris-(3',3',4',4',5',5',6',6'octafluorohexyl) triphenylcyclotrisiloxane, 2,4,6,8-tetrakis-(3',3',4',4',5',5', 6',6'-octafluorohexyl)-2,4,6,8-tetramethylcyclotetrasiloxane.

The silicon hydrides of formula (4), utilized in the practice of the method of the present invention, are well known to the art, and include for example, silane, chlorosilane, methyldichlorosilane, dimethylchlorosilane, phenyldichlorosilane, methylphenylchlorosilane, etc. The fluoroalkenes shown by formula (5) can be readily made by dehydration, by use of such materials as $P_2O_5$, sulfuric acid, etc., of the corresponding fluoroalcohols, examples of which are shown in Joyce Pat. No. 2,559,628.

In the practice of the invention, a silicon hydride is reacted with a fluoroalkene to produce a reaction product having at least one fluorinated monovalent hydrocarbon radical attached to silicon.

The addition of the fluoroalkene to the silicon hydride can be performed at a temperature between 25° to 150° C. However, higher or lower temperatures can be utilized if desired depending upon the physical and chemical properties of the reactants, such boiling point, decomposition temperature, etc. The addition is usually performed in the presence of a catalyst, such as a platinum catalyst, for example $H_2PtCl_6 \cdot H_2O$ can be employed. However, other conventional platinum catalysts such as platinum on charcoal, platinized silica gel, platinized asbestos, solutions of chloroplatinic acid and polar solvents such as alcohols, etc. During the reaction, it has been found expedient to agitate the reactants with a stirrer, or other means, to facilitate the addition of the fluoroalkene to the silicon hydride. Recovery of the addition product can be readily achieved by conventional separation procedures such as distillation, decantation, etc.

In forming the organosilicon cyclics shown by formula (3), the corresponding dihalosilane can be hydrolyzed by standard procedures. For example, a dihalosilane, included by formula (2) can be converted to the corresponding organosilicon cyclic by adding it to a rapidly stirred mixture of an alkali bicarbonate and an organic solvent. Water formed during the reaction can be removed by azeotropic distillation. The resulting cyclics can be recovered by decantation and distillation procedures.

The polymers and copolymers formed by equilibrating cyclics of formula (3) or a mixture of cyclics of formula (3) and cyclics of formula (6), can be gums, viscous masses, semisolids, etc. Elastomeric forming polymers preferably have a ratio of 1.98 to 2.01 radicals per silicon atom also can be made. These polymers can have Z radicals, and organic radicals attached to silicon, such as the R' radicals shown by the organosiloxy units of formula (6).

Various ingredients such as structure additives, pigments, heat stabilizers, for example, iron oxide, or aryl urethanes can be utilized with the polymers of the present invention. In addition, reinforcing fillers such as the silica fillers, particularly, fumed silica filler can be utilized to impart improved strength to the polymers. Nonreinforcing fillers such as titanium oxide, lithopone, calcium carbonate, etc. also can be employed. In addition to the fillers, structure additives such as diphenylsilanediol, alkoxy-stopped polydiorganosiloxanes in which the organo radicals are the same as shown by formulas (6), can be utilized to impart improved properties to the resulting elastomeric forming composition.

Organopolysiloxane elastomers can be made from the polymers and copolymers of the present invention by conventional milling, doughmixing, with the employment of curing catalyst, for example, benzoyl peroxide, tertiarybutylperbenzoate, bis-(2,4-dichlorobenzoyl)perixode, etc. Persons skilled in the art will have little difficulty in determining optimum amounts of the materials utilized for particular applications.

In order that those skilled in the art will be better able to practice the invention, the following examples are given by way of illustration and not by way of limitation. All parts are by weight.

EXAMPLE 1

There was slowly added to a mixture of 228 parts of 3,3,4,4,5,5,6,6-octafluorohexane-1 and 0.1 part of crystalline $H_2PtCl_6 \cdot 6H_2O$ in alcohol, 101 parts of dimethylchlorosilane. The mixture was refluxed and continually stirred during the addition, while the pot temperature rose from a minimum of 50° C. to 88° C. The reaction lasted a total of 50 hours during which time an additional 0.36 part of platinum catalyst was added. The 3,3,4,4,5,5,6,6-octafluorohexene-1 utilized in the reaction was obtained by dehydration of the corresponding octafluoro-2 hexanol utilizing a phosphorous pentoxide slurry in mineral oil.

There were added over a period of about 6 hours, to a mixture of 600 parts of methyldichlorosilane, and 0.4 part of $H_2PtCl_6 \cdot 6H_2O$ in alcohol, 549 parts of 3,3,4,4-tetrafluorobutene-1. The mixture was refluxed for an additional 6 hours to temperatures up to 98° C. The mixture was distilled and there was obtained an 88 percent yield of 3,3,4,4-tetrafluorobutylmethyldichlorosilane having a boiling point of 152° C. to 153° C. at 760 mm. Its identity was confirmed by elemental analysis for weight percent of Cl in $HCF_2CF_2CF_2CH_2CH_2SiMeCl_2$; Calcd: 29.2 percent; Found: 28.2 percent.

EXAMPLE 3

A mixture of 121 parts of 3,3,4,4-tetrafluoro-2-methylbutene-1, 136 parts of trichlorosilane and 0.06 part of platinum catalyst was refluxed for 12 hours to temperatures up to 110°C. The resulting mixture was then fractionated. There was obtained 217 parts of 3,3,4,4-tetrafluoro-2methylbutyltrichlorosilane; $n_D^{25}$ 1.0438. Elemental analysis for percent by weight of Cl in $HCF_2CF_2CH\ MeCh_2SiCl_3$; Calcd: 28.3 percent, Found: 38.2 percent.

EXAMPLE 4

There were added 256 parts of 3,3,4,4-tetrafluorobutene-1 to a mixture of 203 parts of dimethylchlorosilane and 0.06 part of the platinum catalyst of example 1. The mixture was refluxed for a period of 12 hours to temperatures to 77° C. during which time there was added an additional .06 part of platinum catalyst. There was obtained 325 parts of product which boiled at a temperature between 148° C. to 150° C. at atmospheric pressure. The product was 3,3,4,4-tetrafluorobutyldimethylchlorosilane; $n_D^{25}$ 1.3822. Its identity was confirmed by elemental analysis for weight percent Cl in $H\ CF_2CF_2CHCH_2SiMe_2Cl$; Calcd: 15.9 percent; Found: 16.1

EXAMPLE 5

There was distilled into a mixture of 143 parts of trichlorosilane, and 0.06 part of the platinum catalyst used in example 1, 123 parts of 3,3,4,4-tetrafluorobutene-1. The addition required 4½ hours during which time the mixture was heated and stirred. The mixture was refluxed for 2½ hours to a pot temperature of 83° C., and an additional 2 hours to a temperature of 98° C. There was obtained 207 parts of product which boiled at a temperature between 143° C. to 144° C. at 748 mm; $n_D^{25}$ 1.3915. The identity of the product was confirmed by elemental analysis for Cl in $H\ CF_2CF_2CH_2CH_2SiCl_3$; Calcd: 40.4 percent. Found: 40.3 percent.

EXAMPLE 6

There was slowly added to a mixture of 450 parts of sodium bicarbonate and 1200 parts of toluene, 590 parts of 3,3,4,43', 3', 4', 4'of carbon dioxide was maintained from the reaction mixture. The mixture was then heated, and 36 parts of water was azeotroped therefrom. The mixture was then cooled, filtered, and stripped of toluene. The residue weighed 441 parts which represented a 96 percent yield of mixed methyltetrafluorobutylsiloxy cyclics. The crude product was then fractionated and there was obtained 342 parts of 2,4,6-tris-(3',3',4',4'1,3,5-trimethylcyclotrisiloxane, B.P. 100° C. (1.3 mm.) $n_D^{25}$ 1.3752. The identity of the product was confirmed by a molecular weight determination in tetrachlorodifluoroethane. Calcd:

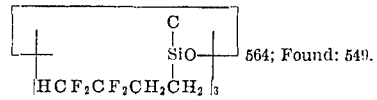
564; Found: 549.

EXAMPLE 7

Tetrabutylphosphonate catalyst was added to a mixture which was at a temperature of 105° C., of 64.5 parts of the above prepared 2,4,6-tris(3',3',4',4'-tetrafluorobutyl)1,3,5-trimethylcyclotrisiloxane, a minor amount of a methylvinylsiloxane, and 25.5 parts of octamethylcylotetrasiloxane. There was utilized sufficient catalyst to provide for a concentration of 50 parts of catalyst, per million parts of mixture. After 2 hours of heating an additional 50 parts, per million parts of the mixture of catalyst was added. After heating the mixture for 4 hours to a temperature of 140° C., there was obtained a polymer that was colored dark yellow. Based on method of preparation, and materials utilized, the polymer was composed of about 50 mole percent of methyltetrafluorobutylsiloxy units chemically combined with about 50 mole percent of a mixture of dimethylsiloxy units and methylvinylsiloxy units.

There was added to 100 parts of the above polymer while it was milled, 35 parts of fumed silica, two parts of iron oxide, and 1.3 part of benzoyl peroxide. After the resulting mixture had been milled to a uniform mass, it was formed into a sheet from which test slabs were cut. The test slabs were press-cured at 300° F. for 15 minutes, and oven-cured 16 hours at 300° F. Other test slabs were press-cured for the same period of time, but were oven-cured for 16 hours at 480° F. In addition, some of the press-cured slabs were immersed in "Fuel B" for 70 hours at room temperature to measure swell resistance. Fuel B was composed of 70 volumes of isooctane and 30 volumes of toluene.

EXAMPLE 8

A copolymer was made in accordance with the procedure of example 1 that was composed of about 40 mole percent of tetrafluorobutylmethylsiloxy units, and about 60 mole percent of a mixture of methylvinylsiloxy units, and dimethylsiloxy units. The copolymer was milled with 50 parts of fumed silica, two parts of benzoyl peroxide, two parts of iron oxide, and 0.6 part of benzoyl peroxide. Test slabs were formed from the compositions which were heated for 15 minutes at 300° F. and oven-cured for 16 hours at 300° F. Other samples were oven-cured for 16 hours at 480° F. Some of the press-cured slabs were measured for swell resistance by the procedure of example 7.

Table I below shows the results obtained when the slabs of example 7 and 8 were measured for "H," Hardness (Shore A), "T" Tensile (p.s.i.) and "E" Elongation (percent). The percent swell shows increase in volume based on weight in air and weight in water calculations.

TABLE I

| Mol percent Z units | 300° F./15 mins. | | | Percent swell | 300° F./16 hrs. | | | 480° F./16 hrs. | | |
|---|---|---|---|---|---|---|---|---|---|---|
| | H | T | E | | H | T | E | H | T | E |
| 40 | 62 | 340 | 140 | 123 | 93 | | | 83 | 351 | 60 |
| 50 | 69 | 421 | 140 | 79 | 80 | | | 83 | 411 | 10 |

EXAMPLE 9

The 2,4,6-tris-(3',3',4',4'-tetrafluorobutyl)1,3,5-trimethylcyclotrisiloxane of Example 6 is polymerized at room temperature to a soft gum consisting essentially of chemically combined

units, with 50 parts of tetrabutylphosphoniumsilanolate, per million parts of reactants. The polymer is decatalyzed by exposing it to carbon dioxide. The polymer is then milled, compounded in accordance with example 7, and cured. It is found that the polymer exhibits satisfactory elastomeric properties and a high degree of resistance to swell when immersed in Fuel B for 70 hours at room temperature.

Based on the results shown in table I, one skilled in the art would know that the organosilicon materials of the present invention having Z radicals attached to silicon by carbon-silicon linkages, can be employed to form a variety of oil resistant organopolysiloxane polymers and copolymers. As shown by table I, these polymers are significantly better with respect to percent swell than comparable organopolysiloxane elastomers free of Z radicals. Those skilled in the art know for example, that an elastomer made from a polydimethylsiloxane would show at least 200 percent swell under the same conditions used in example 8.

While the foregoing examples have of necessity been limited to only a few of the very many variables within the scope of the present invention, it should be understood that the present invention covers a much broader class of fluid compositions formed by reacting a silicon hydride shown by formula (4) and a fluoroalkene shown by formula (5). All of the materials included in the present invention are prepared by methods specifically illustrated in the examples and described further in the foregoing description of the present invention.

I claim:

1. A polymer consisting essentially of chemically combined units having the formula,

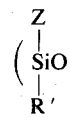

where Z is H(C$_2$F$_4$)$_n$ CHR—C(R)$_2$—, R is a member selected from the class consisting of hydrogen and a lower alkyl radical, $n$ is an integer equal to from 1 to 3, inclusive, R' is a member selected from the class consisting of monovalent hydrocarbon radicals, halogenated monovalent hydrocarbon radicals, and cyanoalkyl radicals.

2. A copolymer consisting essentially of chemically combined units having the formulas,

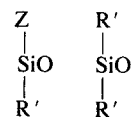

where Z is H(C$_2$F$_4$)$_n$ CHR—C(R)$_2$—, R is a member selected from the class consisting of hydrogen and a lower alkyl radical, $n$ is an integer equal to from 1 to 3, inclusive, R' is a member selected from the class consisting of hydrocarbon radicals, halogenated monovalent hydrocarbon radicals, and cyanoalkyl radicals.

3. A composition convertible to the elastomeric state comprising (1) a copolymer consisting essentially of chemically combined units having the formulas,

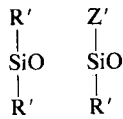

* * * * *